United States Patent
Meyer et al.

(10) Patent No.: US 8,315,484 B2
(45) Date of Patent: Nov. 20, 2012

(54) METHOD AND SYSTEM FOR VERIFICATION OF UNCERTAINLY RECOGNIZED WORDS IN AN OCR SYSTEM

(75) Inventors: Hans Christian Meyer, Oslo (NO); Mats Stefan Carlin, Gjettum (NO); Knut Tharald Fosseide, Kolbotn (NO)

(73) Assignee: Lumex AS, Oslo (NO)

( * ) Notice: Subject to any disclaimer, the term of this patent is extended or adjusted under 35 U.S.C. 154(b) by 1081 days.

(21) Appl. No.: 12/279,253

(22) PCT Filed: Feb. 15, 2007

(86) PCT No.: PCT/NO2007/000053
§ 371 (c)(1), (2), (4) Date: Sep. 8, 2008

(87) PCT Pub. No.: WO2007/094684
PCT Pub. Date: Aug. 23, 2007

(65) Prior Publication Data
US 2009/0067756 A1    Mar. 12, 2009

(30) Foreign Application Priority Data
Feb. 17, 2006 (NO) .................................. 20060787

(51) Int. Cl.
G06K 9/03 (2006.01)
G06K 9/34 (2006.01)

(52) U.S. Cl. .......................... 382/310; 382/176; 382/177

(58) Field of Classification Search ........... 382/309–311
See application file for complete search history.

(56) References Cited

U.S. PATENT DOCUMENTS

| 5,933,525 | A | 8/1999 | Makhoul et al. |
|---|---|---|---|
| 6,205,261 | B1* | 3/2001 | Goldberg ....................... 382/310 |
| 6,628,837 | B1 | 9/2003 | Greene et al. |
| 7,296,019 | B1* | 11/2007 | Chandrasekar et al. ............... 1/1 |
| 2002/0194229 | A1* | 12/2002 | Decime et al. ................ 707/533 |
| 2003/0061025 | A1* | 3/2003 | Abir ................................... 704/7 |
| 2004/0086179 | A1* | 5/2004 | Ma et al. ....................... 382/177 |
| 2004/0107406 | A1* | 6/2004 | Fallman ........................ 715/530 |

(Continued)

FOREIGN PATENT DOCUMENTS
EP    0649112 A2    4/1995
(Continued)

OTHER PUBLICATIONS

Dengel et al. "Techniques for Improving OCR Results" Handbook of Character Recognition and document Image Analysis Singapore, World Scientific Publishing, SG, 1997, pp. 227-258.

(Continued)

*Primary Examiner* — Vu Le
*Assistant Examiner* — Kenny Cese
(74) *Attorney, Agent, or Firm* — Volpe and Koenig, P.C.

(57) ABSTRACT

The present invention provides a method and system for confirming uncertainly recognized words as reported by an Optical Character Recognition process by using spelling alternatives as search arguments for an Internet search engine. The measured number of hits for each spelling alternative is used to provide a confirmation measure for the most probable spelling alternative. Whenever the confirmation measure is inconclusive, a plurality of search strategies are used to reach a measured result comprising zero hits except for one spelling alternative that is used as the correct alternative.

56 Claims, 4 Drawing Sheets

U.S. PATENT DOCUMENTS

| | | | |
|---|---|---|---|
| 2006/0078207 A1* | 4/2006 | King et al. | 382/229 |
| 2008/0104056 A1* | 5/2008 | Li et al. | 707/5 |
| 2009/0063483 A1* | 3/2009 | Chen et al. | 707/6 |

FOREIGN PATENT DOCUMENTS

| | | |
|---|---|---|
| EP | 0657840 A2 | 6/1995 |
| EP | 1239406 A2 | 9/2002 |
| RU | 2166207 C2 | 4/2001 |
| RU | 42118 U1 | 11/2004 |
| WO | 9962000 A2 | 12/1999 |
| WO | 0033211 A2 | 6/2000 |

OTHER PUBLICATIONS

Mihov et al. "Precise and Efficient Text Correction Using Levenshtein Automata, Dynamic Web Dictionaries and Optimized Correction Models" Proceedings of Workshop on International Proofing tools and Language Technologies, 2004, pp. 1-10.

Kilgarriff et al. "Introduction to the Special Issue on the Web As Corpus" Computational Linguistics, Cambridge, MA vol. 29, No. 3, Sep. 2003, pp. 333-347.

Jelinek et al. "Principles of Lexical Language Modeling for Speech Recognition" Advances in Speech Signal Processing, 1992, pp. 651-699.

Strohmaier et al. "Lexical Postcorrection of OCR-Results: The Web As a Dynamic Secondary Dictionary" Proceedings of the Seventh International Conference on Document Analysis and Recognition 2003 IEEE (5 pages).

* cited by examiner

THE VAUGHAN LIVERY

Figure 4

> ...contrived to given...
> ...the bounds of Latinus, straightway rose on dusky...
> ...the walled city of Turnus, the hot-headed...
> city is said to have been founded by Danae...
> Argos after she had been driven ashore by...
> tly gale. Long ago our ancestors named...
> ...still ...

METHOD AND SYSTEM FOR VERIFICATION OF UNCERTAINLY RECOGNIZED WORDS IN AN OCR SYSTEM

The present invention is generally related to Optical Character Recognition systems (OCR), and especially to a method for automatic verification of most probable version of uncertainly recognized words as reported by the recognition process.

There exist many proposals in prior art for providing optical character recognition based on images of text. Optical Character Recognition (OCR) systems works fairly well for high quality scanned paper documents, but typically fails for low quality scans or odd fonts. There are also sometimes spelling errors in the documents captured by the OCR system component. To be able to re-publish the documents, to be able to search the documents electronically (medical records for example, key word searching etc., electronic catalogues, databases with historical documents and information etc.), the conversion of images of text to computer executable form (convert the text to ASCII coded text) is a must that provides a means to work with documents in a highly cost effective way, as known to a person skilled in the art. Therefore, there is a need for a better quality in the result of OCR system components to fully be able to utilize all the possibilities with electronic document handling. The introduction of the Internet has also been a factor increasing demands for a higher quality of the OCR process as such. Images of text stored on computers in PDF format for example, are searchable by Internet browsers. However, the text comprised in the PDF files must be converted to computer readable digital format to be searchable.

Optical Character Recognition (OCR) software systems can be designed to adapt to the text quality and font of the real scanned document. Adaptive OCR is limited to those characters that have known instances of robust character recognition, known statistics, and/or is found in word lists or dictionaries. Some of the remaining uncertain characters after the recognition process will be characters that are either rarely occurring, or which are easily confused with another character in the recognition process providing a character cluster of alternative interpretations of the character. These characters may not be recognized (or verified) within the existing prior art frameworks for OCR. For example, many of these characters may not belong to words in a language specific dictionary since they may be proper names, foreign words or expressions, or simply being from another language. The output from the OCR system is generally a character string representing the text as a digital text. Information about font, size and position may also be included to be able to recreate the style of the original document, for example when re-publishing the document. In addition, most OCR software systems use an individual character probability or score value to identify uncertainly recognized characters or words, and a spell checker that provides alternative words for these uncertainly recognized words.

In prior art there are some examples of using the Internet as a source for documents and information about subjects etc. to establish a method for correcting errors in OCR processed documents.

The article "Using the Web to Obtain Frequencies for Unseen Bigrams" by Frank Keller and Mirella Lapta, 2003 Association for Computational Linguistics" comprises an investigation and an approach to overcome data sparseness for difficult words in an OCR process. One of the questions discussed in this article is if Web frequencies are suitable for probabilistic modeling.

The article "Text Correction Using Domain Dependent Bigram Models from Web Crawls" by Christoffer Ringsletter et. al., AND 2007, describes how web frequencies can be used as a score value to modify an existing ranking of candidates in an existing correction strategy. In the examples described in the article the Web is used as a dictionary as known to a person skilled in the art.

The article "Precise and Efficient Text Correction using Levenshtein Automata, Dynamic Web Dictionaries and Optimized Correction Models" by Stoyan Mihov et. al., Bulgarian Academy of Sciences, 2004, describes a method of building a local dictionary related to the theme of the document under OCR processing from web searches. The conclusion is that small local dictionaries provides the best result.

None of these cited prior art documents provide a substantial improved complete method for correcting OCR outputs. Therefore there is a need for an enhanced OCR functionality that provides confirmation of most probable version of uncertainly recognized words in OCR systems.

According to an aspect of the present invention, Internet search engines may provide the confirmation just by measuring the number of hits measured by using an uncertain word as a search argument in an Internet search engine. According to this aspect of the present invention, a search argument providing zero hits are regarded as a certain confirmation that the uncertainly recognized word is not this particularly version of the word under investigation. If the measured number of hits for an uncertain word is very high, it is certainly possible that this is a correct version. However, according to a further aspect of the present invention, searches should be performed with alternative words and/or combinations of words such that the number of measured hits is zero for all words and/or combinations except for one word and/or one combination. Then the most probable version of the uncertainly recognized words is this particular word identified in this series of measurements with a measurement that is non zero.

According to an aspect of the present invention, such method steps may be implemented in a program on a networked computer that communicates with the Internet through an Application Program Interface (API) communicating with Internet sites. According to this aspect of the present invention, the implemented program receives input about uncertainly recognized words from an OCR program, performs searches through the API for example, and then measures the number of hits as reported by the browser through the API. The measurements for the different spelling alternatives is then used to evaluate the most probable word, or is used to initiate further measurements of spelling alternatives, using single word, combination of multiple words, phrases and/or in combination with wild cards as further search arguments that are measured.

According to an example of embodiment of the present invention, it is possible to establish a confirmation measure for uncertainly recognized words. In an example of embodiment wherein Internet searches are performed according to the present invention, the number of measured hits is all renormalized such that the relative number of hits may be compared. In alternative embodiments of the present invention, more elaborate measurements and threshold levels used for accepting or rejection spelling alternatives are provided. The confirmation measure based on these relative numbers may also be compared with a higher confirmation threshold and a lower confirmation threshold. According to this example of embodiment, whenever a confirmation measure for an uncertainly recognized word is above the higher confirmation threshold, it is regarded as being certainly identified. If the confirmation measure is below the lower confirmation threshold, it is regarded as being certainly not this particular version of the word. If the confirmation measure falls between the upper and lower confirmation threshold, further investigation of the uncertainly recognized word is necessary by performing further searches and measurements.

According to another aspect of the present invention, several strategies may be used to provide word alternatives for the uncertainly recognized word, for example, based on alternatives for an uncertainly recognized character reported by an OCR function, letter statistics etc., and by combining the word under investigation with other certainly recognized words in the text as search arguments. According to an example of embodiment of the present invention, such alternative words and/or combinations of words are investigated by establishing a confirmation measure according to the present invention for all reported search results and then use this measure as outlined above, and repeating searches with alternative search arguments until an answer of most probable version of the word under investigation is reached (all zero except for one).

According to another example of embodiment of the present invention, the higher confirmation threshold and the lower confirmation threshold may be adjusted cooperatively or independent of each other to provide a tuning of the criteria for categorizing the uncertainly recognized word under investigation.

According to an example of embodiment of the present invention, an OCR function reports a list of uncertainly recognized characters and the words in which the uncertainly recognized characters where encountered. Furthermore, the alternatives that are possible for each possible version of the characters are also reported. On basis of these alternative characters, several candidate words are created as being the possible correct version of the word, wherein each candidate word comprises one of the alternative characters, respectively. According to an aspect of the present invention, identifying the most probable correct candidate word can be achieved using each candidate word as a search arguments in an Internet search engine (by using an API, for example), and the measured number of hits from each word forms basis for deciding the most probable version of the word. According to another example of embodiment of the present invention, the confirmation measure outlined above is used in the decision process.

According to another example of embodiment of the present invention, whenever the measurement of hits provides a stalemate between candidates, for example an equal number of hits between two candidates, the candidate words are first combined with the previous word relative to the uncertain word under investigation, and then the combined words are used as search argument on the Internet, secondly the at least one succeeding word relative from the word under investigation on the same text line is used in a similar manner. Further, a combination of the at least one previous word, the word under investigation and the at least one succeeding word is also used as a search argument. The number of hits from each combination is used in a confirmation process to decide the most probable version of the words.

According to yet another example of embodiment of the present invention, whenever the combinations of words provides an inconclusive answer, the word under investigation is combined with a previous word further from the word under investigation. According to the present example of embodiment, the range of words that may be selected as a combination may be limited to a location at a predefined distance, for example such as 5 words from the word under investigation.

In a similar manner the same steps are performed with succeeding words, for example, limited to the fifth succeeding word. However, any distance from the word under investigation may be used, which is a design feature of the present invention. According to another design feature of the present invention, the location from where the distance is calculated from must not necessary be the word under investigation itself, but the distance may be related to an area that enclose the word under investigation, for example. The resulting measured hits from these searches are then used as a basis for deciding the most probable version of the word.

According to yet another example of embodiment of the present invention, the preceding words and the succeeding words that are selected to be combined with the word under investigation is not only based on location relative to the word under investigation, but also on the number of characters the word comprise. According to an aspect of the present invention, long words (for example more than 8 characters long, but any length may be used and may be predefined or user selectable) are preferred as a qualifier for the words under investigation, as described above.

According to yet another example of embodiment of the present invention, the at least one preceding word or at least one succeeding word relative to the word under investigation is selected on basis of frequency of occurrence in a specific language. Frequent words are usually "small words" such as "and", "the, "in, "of", etc., and may easily be understood as not being contributing to the verification process. Therefore it is preferable to use preceding or succeeding words with low frequency of occurrence. In an example of embodiment of the present invention, the number of occurrences of a particular word is reported from the OCR function, and a process according to the present invention checks this number against a threshold. The reported number of occurrence and the threshold may be renormalized as known to a person skilled in the art to provide a relative measure of occurrence.

However, words with high frequencies in the document, but which provides low measured hits in Internet searches, are good candidates for use in combination searches with spelling alternatives for the word under investigation.

According to yet another example of embodiment of the present invention, proper names may be recognized as such on a basis of combining several proper names identified in the text. According to this example of embodiment of the present invention, all words starting with a capital letter is treated as a proper name as long as the preceding character is not a sentence-ending punctuation mark, such as ".?!:". By combining at least two proper names encountered in the text, the confirmation process may return a correct answer. According to this example of embodiment of the present invention, the OCR function reports all possible candidates of being proper names to the confirmation process when performing the recognition process.

According to yet another aspect of the present invention, OCR systems are often used in a specific context, for example in an archive system at a hospital. Patient journals are today often recorded and stored electronically, but old journals are often paper based and needs therefore to be scanned to be integrated into the electronic version of the system. According to an example of embodiment of the present invention, Internet sites that are used for the searching in the confirmation process are selectable. For example, in a case with hospital journals, Internet sites comprising medical information are the best choice for sites to be searched.

According to another aspect of the present invention, any type of knowledge of context related to the document to be scanned in an OCR system may be used as qualifiers of words.

Medical context as described above may be further refined to medical specialties such as orthopedics etc. Other examples may be family history, wherein a special family name is predominant. Other examples may be from science, agriculture, etc. Common for all this "knowledge" is that it is easy to convert this "knowledge" into addresses to search engines comprising relevant information related to the context of the document pages to be recognized. Links to these pages are then used when searching the WEB with the different candidate words of uncertainly recognized words, and the numbers of hits for the different alternatives are then used as a basis for selecting the most probable word. According to an example of embodiment of the present invention, Copernic Agent Professional is used as the search engine wherein the search criteria to be used is selected according to content of the pages to be recognized. In this example of search engine, it is possible to select sites according to law, human resources, government, science etc.

According to yet another aspect of the present invention, even though a word is uncertainly recognized due to uncertainly recognized characters in the word, parts of such words may still be a valid recognized word. For example, "housekeeper" comprises two words "house" and keeper". If the uncertainly recognized part of the word is related to the "keeper" part of the word, searching with combinations comprising "house" would simplify the confirmation process. According to an example of embodiment of the present invention, a dictionary is used to extract identifiable leading parts of uncertainly recognized words. This is achieved by taking the first letter of the word as an argument for the dictionary lookup process, and then combining the first letter with the next letter until the longest possible combination of letters from the word that provides a result from the dictionary lookup process is identified. This part of the word is then used in the searching process as a qualifier for the rest of the word that needs to be confirmed as the most probable word. If the result of the dictionary lookup process is inconclusive, the process continues according to one of the examples of embodiments described above.

According to yet another aspect of the present invention, the same steps of a method according to the present invention may be utilized in a spell checking process. Spell checking algorithms will in most cases be able to spell check those words that are part of the language-specific dictionary. Some classes of words like words in foreign languages and proper names cannot be expected to be found in the language-specific dictionary as there are often limitations to the size and consistency of the dictionary. By utilizing the aspects of the present invention as outlined above, a method comprising steps according to the present invention may solve incorrect spelled words.

According to yet another aspect of the present invention, uncertainly recognized words are often encountered in speech recognition systems as well. Whenever a recognition process, being an optical recognition or speech recognition process etc. reports uncertainly recognized words, possible variations of the uncertainly word is then established, for example through suggestions of character alternatives for an uncertainly recognized character as proposed by the recognition process itself, or by identifying real words as part of a word as described above, searching the WEB may provide a process identifying the most probable word as the correct recognition of the word.

According to yet another aspect of the present invention, uncertainly recognized characters may be combinations of two or more characters. For example, the character "m" may be a combination of "r" and "n", or the other way round. That is, an uncertainly recognizes "r" and "n" can be an "m". It is therefore inside the scope of the present invention to provide solutions with variable number of uncertainly recognized characters.

Figure 7:
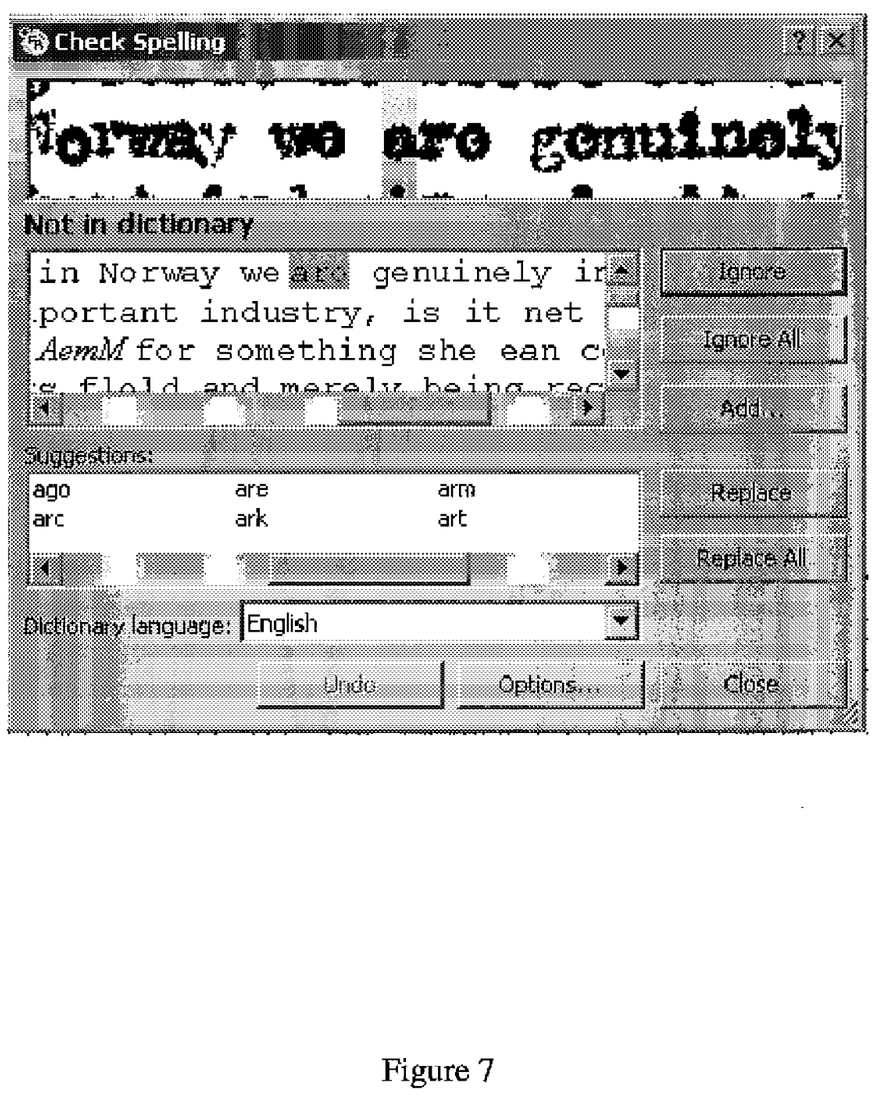
FIG. 7 illustrates an example of output from an existing OCR program.

According to an aspect of the present invention, the confirmation process is performed in three major steps. The recognition process, for example an optical recognition process (OCR), first identifies uncertainly recognized characters together with character classification alternatives for this character. FIG. 7 illustrates an example of output from a commercial available OCR program. An example of the OCR process could be that the character "i" may have the alternatives "l" and "j". Secondly, the word or phrase that the character is part of is used as input to a web search engine forming one search for each alternative character combination of that particular word or phrase. For example, with the alternatives "i", "l" and "j", three alternatives are used for the word under investigation. Thirdly, the web search engine results are analyzed with respect to number of occurrences or the probability for each alternative character combination, and the most probable alternative is selected. According to an example of embodiment of the present invention, a program performs the above method steps by communicating with the Internet through an API for an Internet browser, providing the spelling alternatives as search arguments, and measures the hits for the spelling alternatives. The spelling alternatives as depicted in FIG. 7 may also be reported as a file that may be communicated to the program according to the present invention, as known to a person skilled in the art.

Figure 1:
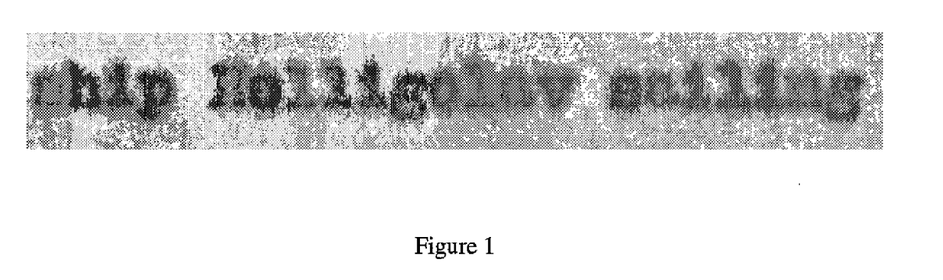
FIG. 1 illustrates an example a difficult word "Helligolav".
Figure 2:
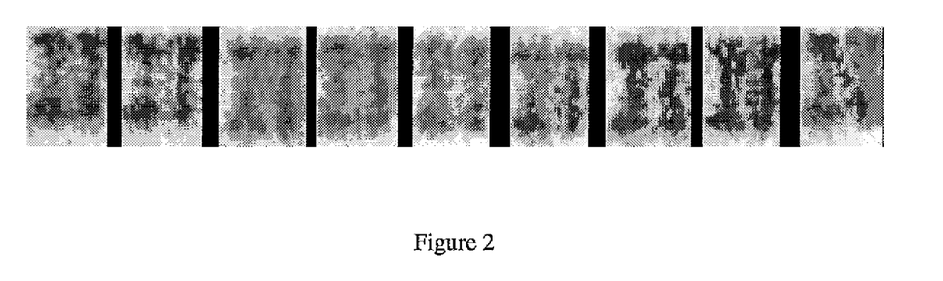
FIG. 2 illustrates an example of dubious recognition of the letters "N" and "H".

An example that illustrates the application of an embodiment according to the present invention is taken from a letter written in 1926, and which is stored in the Norwegian National Archives (Riksarkivet). The content of the letter is related to shipment of reindeer across the Atlantic Ocean with the steamships Helligolav and Stavangerfjord. The proper names of these two ships cannot be found in any existing English dictionary. Further, in this example of OCR processing, the character "N" and "H" as illustrated in FIG. 2 is difficult to distinguish. A sentence from the letter of 1926 is illustrated in FIG. 1. Therefore, there exist two alternatives as reported from the OCR function, "Helligolav" and "Nelligolav". There exists no statistical preference for any of the alternatives in a letter frequency statistics.

Figure 3:
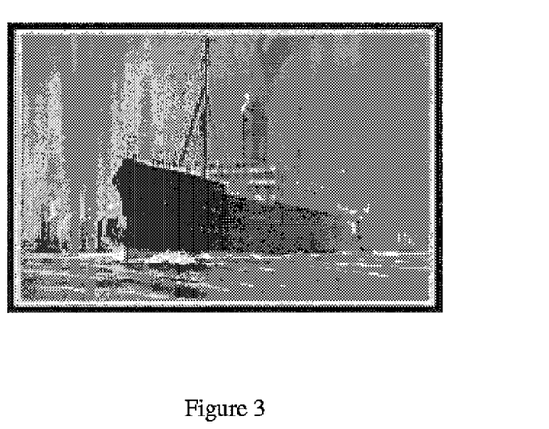
FIG. 3 illustrates a picture of a ship encountered when searching the Internet.

However, if we use the two alternatives "Helligolav" and "Nelligolav" as queries in a web search engine, there are 65 web pages containing the word "Helligolav" and none containing the non-sense word "Nelligolav", a clear verification that the word should be recognized as "Helligolav". One of the search results is a picture of the ship as illustrated in FIG. 3.

According to another aspect of the present invention, knowledge about the content in a document to be recognized may be used in the confirmation process. In the example above, the knowledge that the letter comprise content related to ships, animals etc. may be utilized such that the queries are submitted to Internet sites comprising information related to ships, animals etc. The return of a picture from a picture gallery comprising illustrations of ships is then a strong identification about the meaning of the word. One way of identifying a picture is by identifying the file extension as being for example ".BMP. ".JPG", etc.

Figure 4:
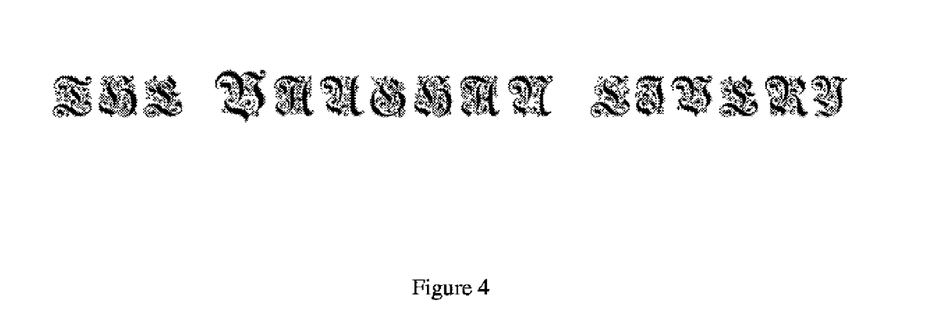
FIG. 4 illustrates an example of search result using the search phrases "Helligolav" and "Nelligolav".

Another example of use of an embodiment of the present invention comprises a phrase from the popular book "Dark Fire" by the author C. J. Sansom typed in an odd black-letter font, as depicted in FIG. 4. The quality of the scanned image of this sentence is of excellent quality, and therefore most of the text can be decoded by matching similar symbols and perform a deciphering of the symbols as a monoalphabetic substitution cipher, as well-known to a person skilled in techniques used in cryptanalysis.

The remaining indecipherable words are words like the proper name "Vaughan", since the 'V' is indecipherable because there are no other capital 'V's in the text and the word "Vaughan" is not found in a dictionary. By letter frequency statistics as known to a person skilled in the art, the possibilities of the confusion alternatives of 'V' are limited to the consonant capital letters 'BCDFGHJKLMNPQRSTVWX'. The measured results of web search queries with these alternative hypotheses are listed Table 1 below.

TABLE 1

| Word Query | Query results (number of web pages) |
|---|---|
| Baughan | 629 000 pages |
| Caughan | 12 300 pages |
| Daughan | 3 030 pages |
| Faughan | 32 300 pages |
| Gaughan | 1 240 000 pages |
| Haughan | 13 800 pages |
| Jaughan | 45 pages |
| Kaughan | 199 pages |
| Laughan | 502 pages |
| Maughan | 897 000 pages |
| Naughan | 376 pages |
| Paughan | 46 pages |
| Qaughan | 1 page |
| Raughan | 211 pages |
| Saughan | 63 pages |
| Taughan | 98 pages |
| Vaughan | 24 900 000 pages |
| Waughan | 733 pages |
| Xaughan | 2 pages |

Even though Vaughan is most probable with almost 90% of the total number of query hits, no conclusive decision can be made directly based on these results. It is possible to rule out 'Xaughan' and 'Qaughan' as very improbable because of the very low number of hits, but there is still a 10% chance of an erroneous classification if the 'Vaughan' alternative is selected.

However if we use the search phrase "Vaughan livery" instead, we only find 4 pages containing the phrase with a lead 'V', and none of the other character combinations returns any query measurement hits. The explanation for these results are that while the Vaughan family is part of the old English aristocracy and hence had servants in "Vaughan livery", none of the other families Baughan, Caughan, Maughan etc. had servants in their livery as they are not part of the nobility. By using knowledge about the content of the text to be recognized, the most probable word may be identified. In this example, the word "livery" is the first succeeding word after the word under investigation. Therefore, just by combining this word with all the other possible alternatives as search arguments, the combined word reveals the meaning of the content, and hence the most probable version of the word under investigation.

Figure 5:
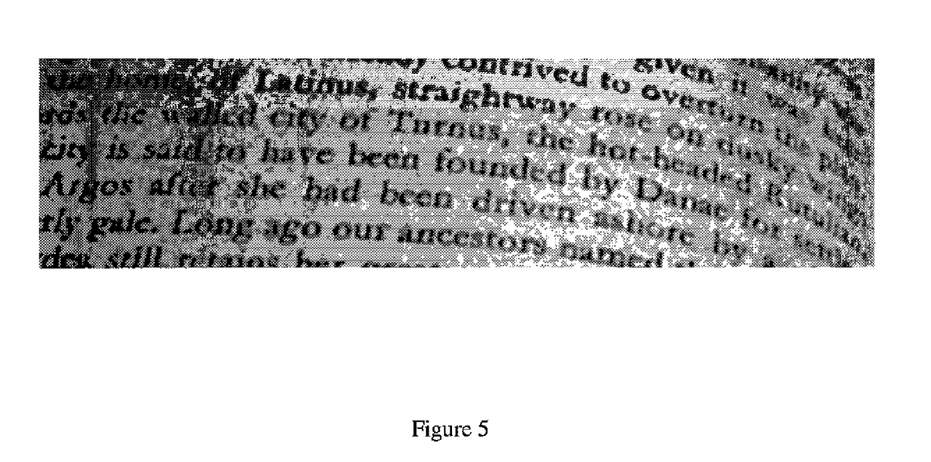
FIG. 5 illustrates another example of difficult recognizable word.

In FIG. 5, there is depicted a text taken from the Aenid of Vergil, in which one of the uncertainly recognized words are Danae with the alternative spelling Danac. Neither word is found in the dictionary. In the same text we have certainly recognized the words Latinus, Turnus, Rutulian, Argos and Long.

TABLE 2

| Words | Counts | Long | Argos | Turnus | Latinus | Rutulian |
|---|---|---|---|---|---|---|
| Danae | 2.510.000 | 301.000 | 43.900 | 584 | 525 | 238 |
| Danac | 101.000 | 24.700 | 130 | 6 | 2 | 0 |
| Counts | | 2.270.000.000 | 11.800.000 | 1.960.000 | 807.000 | 880 |
| Ratio | 96% | 93% | 99.7% | 99% | 99.7% | 100% |
| Relative word co-occurrence | | 0.01% | 0.4% | 0.02% | 0.06% | 27% |

With reference to table 2, the ratio of web query search hits between Danae and Danac is 96% in favor of Danae, something which cannot be seen as conclusive. One possible strategy is to use web search combining the search words with the other certainly recognized words. The word Long is very common and only 0.1 per mille of all documents containing the word Long contains either Danae or Danac, and the hit ratio is 93%. The words Argos, Turnus and Latinus are all returning hit ratios combined with Danae and Danac that favors Danae (>99%), but the relative word co-occurrence is still small. It is the least common word Rutulian that only results in 880 hits alone, that leads to a conclusive argument. Rutulian is never combined with Danac, but in 27% of the documents containing the word Rutulian, we will also find the word Danae, indicating a strong word co-occurrence.

The generalization of this principle is that certainly recognized words with low frequency counts on web search queries that co-occur with one of the word alternatives provides more reliable answer than certainly recognized words with high frequency. Generally, an aspect according to the present invention is that it is possible to certainly identify what a word is not. This is achieved by identifying alternatives that returns zero measurement hits from the searching on the WEB. Generally, the number of returned measured hits may fall inside three categories:

1) The resulting number of measured hits is above a predefined upper threshold for one of the alternatives. Then this alternative is selected.
2) The number of measured hits is under a lower threshold. Then this alternative is discarded.
3) The number of measured hits falls between the upper and lower threshold. Then the alternative is further investigated.

According to an example of embodiment of the present invention, these three categories may be used as a confirmation measure of probable version of a word under investigation. According to an alternative embodiment of the present invention, the upper threshold and the lower threshold may be varied up or down cooperatively, or independent. For example, the 100% of total hits may be divided into three sections defined by a 10% above upper threshold, a 10% under lower threshold, which implies that 80% of the hits fall in between the thresholds. According to the alternative embodiment, the ranges may be divided as 5%, 90%, 5%, respectively, or as 10%, 70%, 30%, respectively. Any division is inside the scope of the present invention.

According to an example of embodiment of the present invention, a method comprising steps for confirming most probable version of an uncertainly recognized word comprises the following steps:

a) Whenever a recognition process reports an uncertainly recognized character, the word comprising this character is recorded such that the version alternatives of the character is inserted into the position of the character in the word, thereby creating a list comprising word alternatives. An OCR function as known to a person skilled in the art provides such information.

b) The words in the list are then used as queries one by one in an Internet browser as known to a person skilled in the art. The search results are measured and stored in a list, for example.

c) The next step is then to investigate the result in the report list. The confirmation selection process is based on the observation that those searches returning zero results provide a certain confirmation about what the word is not. Therefore the process will further only investigate those listings that provide a search result different from zero. However, the interpretation of the number of hits is not only related to the greatest number of hits on the Internet but on a relative hit rate relative to the other hits. If the relative hit rate is above an upper predefined threshold for a specific alternative, this alternative is selected as the most probable word.

d) If the relative hit rate is under the upper threshold, and the relative hit rate is above a lower hit rate threshold, further investigation is performed. If the alternative word has a relative hit rate outside the upper and lower threshold, the alternative is treated as being certainly not the word.

e) Further, investigation of the uncertainly recognized word comprises steps for verifying if the word has a capital letter, and therefore is a probable proper name. If the recognition process returns other probable proper names, at least two proper names are used as a combined search query. Again, the combination of words returning zero hits is ruled out as being candidates. The remaining results are then tested according to the confidence interval, either being above an upper threshold or under a lower threshold, or as being a candidate for further investigation when inside the upper and lower threshold limits.

f) If the proper name test fails, a further step is to perform a combination of at least one preceding and at least one succeeding word found in the text relative to the word under investigation. The same confidence test is performed.

g) If the combined word tests in step f) fails, then at least one preceding or at least one succeeding words comprising a number of characters above a predefined threshold is selected to be combined with the word under investigation. The confidence test is then performed on the reported results. By using only words above a certain length, small words like "a", "the", "and" etc. are avoided as search arguments.

h) If the confidence test in step g) fails, then a relative frequency count of at least one preceding or at least one succeeding words are performed, and only those words with low relative frequency count is used in step g). The measurements for the different spelling alternatives is then used to evaluate the most probable word, or is used to initiate further measurements of spelling alternatives, using single word, combination of multiple words, phrases and/or in combination with wild cards as further search arguments that are measured.

i) If the confidence test fails in step h) and/or g), then the first characters of the word is used as input to a dictionary look up process. When the combination of characters that returns a valid result from the dictionary look up process is reached, this part of the word under investigation is a valid word that is combined with the alternatives for the remaining part of the word. The confidence test is then performed again.

j) If any of the steps c) to i) returns inconclusive answers for the word under investigation, the upper threshold and lower thresholds are changed in cooperatively steps a number of predefined times, and the confirmation steps c)

i) are repeated.

k) If step j) also fails, random selections of upper and lower thresholds are used, and the confirmation steps c) to i) are repeated.

l) If the confidence test fails in step k), the alternative having the highest hit rate of the search results in step d) is selected as the most probable word.

In the example of embodiment of the present invention as described above, the uncertainly recognized character may be two or more characters that are difficult to distinguish. For example, the character "m" may be a combination of "r" and "n", for example, but the OCR function has problems distinguishing each respective character. It is also a possibility that the OCR function interprets a combination of "r" and "m" distinctively, but the character is actually "m". In all embodiments of the present invention, any reference to an uncertainly recognized character may comprise one or more uncertainly recognized characters as illustrated here. In this context, the expression "spelling alternative" comprises substitution of an uncertainly recognized character with the one or more possible substitution of one character with a combination of two other characters, or vise versa.

According to another aspect of the present invention, the threshold values used to determine acceptance of a spelling alternative is related to measurements of possible spelling alternatives as described above. However, the total number of hits that are measured will in some sense influence the actual level of thresholds that are used. According to an example of embodiment of the present invention the acceptance level for a spelling alternative i, denoted as acceptance(i) can be expressed as:

$$\text{acceptance}(i) \Leftrightarrow \frac{\#\ hits_i}{\sum_{i=1}^{n} \#\ hits_i} \geq \gamma(\#\ hits)$$

wherein i denote one of the spelling alternatives, # $hits_i$ is the measured number of hits for spelling alternative i, the denominator is the total measured number of hits for all spelling alternatives, and $\gamma(\# hits)$ is a threshold level that is a function of the number of hits.

In another example of embodiment of the present invention, the acceptance(i) is defined as:

$$\text{acceptance}(i) \Leftrightarrow \frac{\# hits_i}{\max(\# hits_j)_{j \neq i}} \geq \gamma(\# hits),$$

wherein $\max(\#hits_j)_{j \neq i}$ is the total measured number of hits for all spelling alternatives not including the spelling alternative for i, and the other parameters are as defined above.

In an example of embodiment of the present invention, $\gamma$ is one of two possible values, one for very high number of hits and another otherwise. In yet another example of embodiment of the present invention there is different $\gamma$'s for phrases, single words and multiple words, if the searching comprises wildcards etc., and whenever a spelling alternative is measured as a single word, as part of multiple word searches, or as a phrase, the different threshold levels are used respectively to verify the most probable spelling alternative.

Another form of the acceptance value could be to keep the metric in the range [0,1], an example of threshold can then be:

$$\text{acceptance}(i) \Leftrightarrow \frac{\# hits_i}{\# hits_i + \max(\# hits_j)_{j \neq i}} \equiv rBest(i) \geq \gamma(\# hits)$$

wherein the parameters are as defined above. The definition of the threshold is also denoted as rBest(i) used as argument in a merit function defined below.

According to another aspect of the present invention, it is also possible to measure and make comparisons with threshold levels to reject a spelling alternative, for example by using:

$$\text{rejection}(i) \Leftrightarrow \frac{\# hits_i}{\# hits_i + \max(\# hits_j)_{j \neq i}} \equiv rBest(i) \leq \kappa(\# hits)$$

wherein the parameters are as defined above, while the lower threshold level as a function of the number of hits is denoted as $\kappa(\#hits)$.

In an example of embodiment of the present invention, $\kappa$ is one of two possible values, one for very high number of hits and another otherwise. In yet another example of embodiment of the present invention there is different $\kappa$'s for phrases, single words and multiple words, if the searching comprises wildcards etc., and whenever a spelling alternative is measured as a single word, as part of multiple word searches, or as a phrase etc., the different threshold levels are used respectively to verify the most probable spelling alternative.

As known to a person skilled in the art, OCR programs may also report character probabilities or score values, denoted CRS value, which may be used to design a merit function that includes both the CRS and #hits from the network searches. Such merit functions may be used as acceptance values or rejection values, respectively. According to an aspect of the present invention, the most likely word is the one that maximizes the merit function, for word i:

$$totscore(i) = aCRS_{word}(i) + b\frac{\# hits_i}{\max(\# hits_j)_{j \neq i}}$$

wherein $a+b=1$, $CRS_{word}(i)$ is a character score value from the OCR process related to the spelling alternative i, max$(\#hits_j)_{j \neq i}$ is the total measured number of hits for all spelling alternatives not including the spelling alternative for i. The weighting factors a and b can be used to regulate the relative importance or contribution to the function value from the CRS value and number of hits, respectively.

An even more complicated merit function could be:

$$totscore(i) = a'CRS_{word}(i) + b'(1 - \min(CRS_i)) - c'\frac{1 - \sum_{k=1}^{nchar} \Delta CRS_{i,k}}{nchar} +$$
$$d' f(rBest(i)_{phrase}, rBest(i)_{single\ word}, rBest(i)_{mult\ word})$$

where the second term is the minimum CRS for all the characters in the word, the third term is the sum of the CRS difference between the highest CRS for each character and the CRS using word(i). The function f is either a minimum or maximum function, respectively, of the different acceptance levels as defined above related to the single word i, the acceptance level for phrases comprising the word i, and multiword searches comprising the word i. In the function $a'+b'+c'+d'=1$, and is used to regulate the contribution from each element. nchar is the number of characters in words i.

According to an aspect of the present invention, the wording "threshold level" is to include, but not be limited to: a selected number, a renormalized number, an acceptance level, a total score value, or a rejection level.

The method according to the present invention as described above may be implemented as software routines in an existing OCR system, as known to a person skilled in the art. The only prerequisite is that the recognition function reports the uncertainly recognized characters and the words comprising these characters. Further, the recognition function should report the alternatives for the uncertainly recognized character. Further, the order of confirmation steps do not necessarily have to be performed as described above, that is step i) may be performed before step h), as understood by a person skilled in the art.

According to embodiments of the present invention, whenever a search argument is combined with other words, parts of words may also be used. Further, the operation of combining items for providing a search argument include, but is not limited to, using well known search operators, for example "house AND keeper", wherein AND is the operator as the search argument, and which is well known to a person skilled in the art. Further, it is to be understood that it is also possible to omit certain types of files in the searching by using specific search operators. For example, providing a "-PDF" after the search argument omits all PDF types of files, which very often comprise scanned images of text. By issuing such a command, the search process avoids investigating documents comprising the typical types of errors the search process is aimed at correcting, thereby qualifying the documents used as basis for the verification as being "clean" documents.

Further examples of embodiments of the present invention comprise a confirmation process that first identifies the number of hits preceding words and succeeding words provide when used as search arguments in a search engine. Those succeeding words with low hit rate different from zero (under a first threshold), and which comprise a high number of characters (above a second) threshold, are used in combination with the word under investigation as a spelling alternative for the confirmation process.

According to another example of embodiment of the present invention, the higher confirmation threshold and the lower confirmation threshold may be changed cooperatively or independent of each other to provide a tuning of the criteria for categorizing the uncertainly recognized word under investigation. According to this example of embodiment, whenever the thresholds are changed, a new search is initiated, and the process is repeated until termination, either when a result exceeds the higher threshold, or as an inconclusive result, where the chosen spelling alternative providing highest number of hits is selected as the most probable version of the word under investigation.

According to yet another example of embodiment of the present invention, a user may select a range of sites the search engine is going to use when performing the confirmation process. According to this embodiment of the present invention, not only Internet sites are selectable, computers connected to Intranets, VPR networks or similar networks may also be selected. According to this example of embodiment, all necessary authentification and associations are performed on basis of information contained in the list selected by the user when referencing such computers, as known to a person skilled in the art. It is also important to point out that the information sources are not necessarily limited to computer storing information connected to networks, but the search engine according to the present invention may also search a locally or remote connected hard disk drive comprising information as outlined in the principles of the present invention. That is, any file system or method of mounting a file system residing on local computers or computers in a network is viewed as being inside the scope of the present invention, and as being searchable sites.

A person skilled in the art may easily understand that the same method and systems according to the present invention may be utilized in any type of recognition system, for example speech recognition systems. The confirmation process may be based on phonemes, rather than single characters as confusion alternatives.

Further, it is also easily understood by a person skilled in the art that similar steps according to the present invention may be performed in a spell checking environment.

Figure 6:
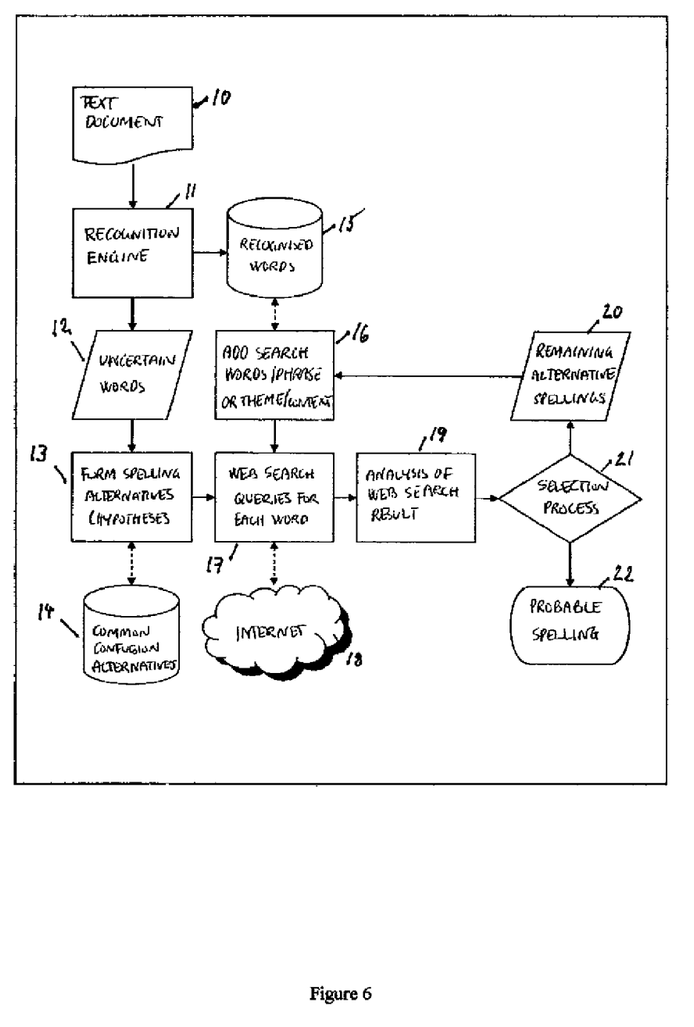
FIG. 6 depicts a flow diagram of an example of method according to the present invention.

FIG. 6 illustrates an example of embodiment of a system according to the present invention as a flow diagram of a computer program performing steps of a method according to the present invention providing a confirmation of most probable word of an uncertainly recognized word in an OCR system this embodiment is communicating with.

A text document 10 is input to a recognition engine 11 reporting uncertain words 12 as a list of uncertainly recognized characters together with the words wherein these characters have been encountered. The spelling alternatives or hypotheses are constructed in 13.

The spelling alternatives are then used as queries in WEB searches in 17.

Alternatively, the proper recognized words are recorded in 15. In 16 a process adding words or phrases or theme/content to the document is performed. Together with the spelling alternatives from 18, these combinations are used as search arguments in 17.

The analysis in 19 comprising confirmation steps according to the present invention is executed on the search results provided from 17. The selection process in 21 may use the confirmation measure as described above to do the actual selection. However, any selection process may be implemented according to the present invention. If the selection process is inconclusive, the process returns the inconclusive results back to 16, and the process continues until a conclusive result has been reached, or the number of possible iterations of strategies and/or threshold adjustments is exhausted. Then the selection process 21 terminates the process by selecting the alternative for the word under investigation providing the highest confirmation measure, and reporting this alternative back to the OCR engine that provides a full text comprising all the confirmed uncertainly recognized words substituted with the most probable alternative for each.

According to another aspect of the present invention a blank character is also viewed as being a character that can be an uncertainly recognized character. This is a situation wherein a word is mistakenly split in two halves, for example. It is inside the scope of the present invention to form spelling alternatives comprising removing a character from a word or phrase.

The invention claimed is:

1. A method for resolving contradicting output data from an Optical Character Recognition (OCR) system, wherein the output data comprises at least one word with at least one uncertainly recognized character, wherein the at least one uncertainly recognized character is reported in the output data together with probable alternatives for the at least one uncertainly recognized character, and the words wherein the at least one uncertainly recognized character has been encountered in an image of a text being processed by the OCR system, the method comprises the steps of:

using an Internet search engine with search arguments established according to a search strategy comprising:

a) providing initial search arguments by forming spelling alternatives for the words comprising the at least one uncertainly recognized character by substituting the at least one uncertainly recognized character with the reported probable alternatives for the at least one character, one by one, and in possible combinations in each encountered word, or by removing a character, thereby forming a plurality of spelling alternatives, and then measuring and recording number of hits for search results of each respective spelling alternative that has been formed in this manner, b) comparing the measured number of hits for each of the spelling alternatives with an upper predefined relative threshold level and a lower predefined relative threshold level, wherein each of the respective comparisons of the plurality of measurements falls into one of three possible outcomes:

i) if the measurement of a spelling alternative is above the predefined relative upper threshold level, the corresponding spelling alternative for this measurement is the correct spelling alternative for the word, and terminating the Internet search, ii) if the measurement of a spelling alternative is below the lower predefined relative threshold level, the corresponding spelling alternative for this measurement is deemed non- existing, and the word with this spelling alternative is discarded from further investigations, and continuing with other spelling alternatives that has been formed as search arguments for the Internet search engine, iii) if the measurement of a spelling alternative falls between the upper relative threshold level and the lower relative threshold level, exit the Internet search engine and modifying the search strategy providing further search arguments as a combination of members of the remaining spelling alternatives and other words encountered in the document, other character alternatives for the at least one uncertainly recognized character, phrases, adapting the upper relative threshold level, adapting the lower relative threshold level, and/or other information related to the output data from the OCR system, before continuing using the search strategy providing further measurements and comparisons for resolving the contradicting output data, c) continuing processing step b) a number of predefined times, or until there is only one spelling alternative left, whatever occurs first, providing an iteration amongst a plurality of different search arguments used in the search strategy before terminating step b), and using the remaining spelling alternative having the highest measurement above the upper relative threshold level as the correct spelling alternative.

2. The method according to claim 1, wherein the search strategy comprises substituting the at least one uncertainly recognized character with a combination of at least two characters when forming the spelling alternatives.

3. The method according to claim 1, wherein the search strategy comprises substituting two or more of the at least one uncertainly recognized character with a single character when forming the spelling alternatives.

4. The method according to claim 1, wherein the search strategy comprises steps identifying if the spelling alternative under investigation is a proper name, and if so identify in the OCR process other recognized words that are proper names, then provide as a spelling alternative a combination of the word under investigation together with at least one other properly recognized proper name.

5. The method according to claim 1, wherein the search strategy comprises using at least one preceding word relative to the word under investigation in combination with the word under investigation as the spelling alternative.

6. The method according to claim 1, wherein the search strategy comprises using at least one succeeding word relative to the word under investigation in combination with the word under investigation as the spelling alternative.

7. The method according to claim 1, wherein the search strategy comprises using at least one preceding word further away relative to the word under investigation in combination with the word under investigation as the spelling alternative.

8. The method according to claim 1, wherein the search strategy comprises using at least one succeeding word further way relative to the word under investigation in combination with the word under investigation as the spelling alternative.

9. The method according to claim 1, wherein the search strategy comprises using at least one preceding word further away relative to the word under investigation which comprises a number of characters above a predefined threshold in combination with the word under investigation as the spelling alternative.

10. The method according to claim 1, wherein the search strategy comprises using at least one succeeding word further away relative to the word under investigation which comprises a number of characters above a predefined threshold in combination with the word under investigation as the spelling alternative.

11. The method according to claim 1, wherein step b) substep iii) comprises:
i) obtaining a counting of occurrence of words encountered in the image of the text in the OCR process,
ii) using at least one preceding word further away relative to the word under investigation which has a low number of occurrences under a predefined threshold in combination with the word under investigation as the spelling alternative.

12. The method according to claim 11, wherein the search strategy comprises:
using at least one succeeding word further away relative to the word under investigation which has a low number of occurrences under a predefined threshold in combination with the word under investigation as the spelling alternative.

13. The method according to claim 1, wherein step b) substep iii) comprises:
i) obtaining a counting of occurrence of words encountered in the image of the text in the OCR process,
ii) using at least one preceding word further away relative to the word under investigation which has a high number of occurrences over a first predefined threshold and which comprise a high number of characters in the word above a second threshold in combination with the word under investigation as the spelling alternative.

14. The method according to claim 13, wherein the search strategy comprises:
using at least one succeeding word further away relative to the word under investigation which has a high number of occurrences over a first predefined threshold and which comprise a high number of characters in the word above a second threshold in combination with the word under investigation as the spelling alternative.

15. The method according to claim 1, wherein step b) substep iii) comprises:
selecting preceding words further away relative to the word under investigation one by one and listing those preceding words that comprise a number of characters above a predefined threshold,
using the selected preceding words as search arguments in an Internet search engine and identify the word that provides a lowest number of hits different from zero, and use that word in combination with the word under investigation as the spelling alternative.

16. The method according to claim 1, wherein step b), substep iii) comprises:
selecting succeeding words further away relative to the word under investigation one by one and listing those succeeding words that comprise a number of characters above a predefined threshold,
using the selected succeeding words as search arguments in an Internet search engine and identify the word that provides a lowest number of hits different from zero, and use that word in combination with the word under investigation as the spelling alternative.

17. The method according to claim 1, wherein the comparison with the upper threshold and the comparison with the lower threshold is based on a renormalization of the thresholds and reported total number of hits.

18. The method according to claim 1, wherein the respective upper and lower threshold is changed incrementally upwards and downwards cooperatively, and whenever a change of thresholds are performed, initiating a new search and confirmation process.

19. The method according to claim 1, wherein the respective upper and lower threshold is changed incrementally upwards and downwards independently, and whenever a change of thresholds are performed, initiating a new search and confirmation process.

20. The method according to claim 1, wherein the search strategy comprises the steps of:
selecting leading characters one by one from the word under investigation,
combining these characters in an increasing number of leading characters,
use each of the instances of increasing number of characters as an argument for a dictionary look up, and if the dictionary returns a true word from the dictionary look up, use this word in combination with the word under investigation as the spelling alternative.

21. The method according to claim 1, wherein the search engine, as an alternative or in addition to performing searches on the Internet, searches in other information sources not accessible via the Internet, but which are accessible via an Intranet, Virtual Private Net, or similar networks, or directly by searching a connected hard disc drive comprising information.

22. The method according to claim 21, wherein a user may select from a list of information sites which information sites in the list are to be searched during the confirmation process.

23. The method according to claim 1, wherein the upper threshold is defined as $$acceptance(i) \Leftrightarrow \frac{\# \ hits_i}{\sum_{i=1}^{n} \# \ hits_i} \geq \gamma(\# \ hits)$$

wherein i denotes one of the spelling alternatives, #hits$_i$ is the measured number of hits for spelling alternative i, the denominator is the total measured number of hits for all spelling alternatives, and γ(#hits) is a threshold level that is a function of the number hits.

24. The method according to claim 1, wherein the upper threshold is defined as $$acceptance(i) \Leftrightarrow \frac{\# \ hits_i}{\max(\# \ hits_j)_{j \neq i}} \geq \gamma(\# \ hits)$$

wherein i denotes one of the spelling of alternatives, #hits$_i$ is the measured number of hits for spelling of alternative i, max(#hits$_j$)$_{j \neq i}$ is the total measured number of hits for all spelling of alternatives not including the spelling alternative for i, and γ(#hits) is a threshold level that is a function of the number hits.

25. The method according to claim 1, wherein the lower threshold is $$rejection(i) \Leftrightarrow \frac{\# \ hits_i}{\# \ hits_i + \max(\# \ hits_j)_{j \neq i}} \equiv rBest(i) \leq \kappa(\# \ hits)$$

wherein # hits$_i$ is the measured number of hits for spelling alternative i, max(#hits$_j$)$_{j \neq i}$ is the total measured number of hits for all spelling alternatives not including the spelling alternative for i, and κ(#hits) is a threshold level that is a function of the number hits.

26. The method according to claim 1, wherein a merit function is used to define a measurement for the number of hits as:

$$totscore(i) = aCRS_{word}(i) + b\frac{\# \ hits_i}{\max(\# \ hits_j)_{j \neq i}}$$

wherein a+b=1, CRS$_{word}$(i) is a character score value from the OCR process related to the spelling of alternative i, max(#hits$_j$)$_{j \neq i}$ is the total measured number of hits for all spelling of alternatives not including the spelling alternative for i.

27. The method according to claim 1, wherein a merit function is used to define a measurement for the number of hits as:

$$totscore(i) = a'CRS_{word}(i) + b'(1 - \min(CRS_i)) - c'\frac{1 - \sum_{k=1}^{nchar} \Delta CRS_{i,k}}{nchar} + d'f(rBest(i)_{phrase}, rBest(i)_{single \ word}, rBest(i)_{mult \ word})$$

wherein a'+b'+c'+d'=1, CRS$_{word}$(i) is a character score value from the OCR process related to the spelling alternative i, the second term is the minimum CRS for all the characters in the word, the third term is the sum of the CRS difference between the highest CRS for each character and the CRS using word (i), f is a minimum or maximum function of the upper threshold or lower threshold values as defined:

$$acceptance(i) \Leftrightarrow \frac{\# \ hits_i}{\sum_{i=1}^{n} \# \ hits_i} \geq \gamma(\# \ hits)$$

wherein i denotes one of the spelling alternatives, #hits$_i$ is the measured number of hits for spelling alternative i, the denominator is the total measured number of hits for all spelling alternatives, and γ(#hits) is a threshold level that is a function of the number hits; and nchar is the number of characters in the word i.

28. The method according to claim 1, wherein the OCR system is a speech recognition system, and the at least one uncertainly recognized character is an uncertainly interpretation of a phoneme.

29. A system for resolving contradicting output data from an Optical Character Recognition (OCR) system, wherein the output data comprises at least one word with at least one uncertainly recognized character, wherein the at least one uncertainly recognized character is reported in the output data together with probable alternatives for the at least one uncertainly recognized character, and the words wherein this at least one uncertainly recognized character has been encountered in an image of a text being processed by the OCR system, the system comprises:

a system component using an Internet search engine with search arguments established according to a search strategy comprising:

a) the system component provides initial search arguments by forming spelling alternatives for the words comprising the at least one uncertainly recognized character by substituting the at least one uncertainly recognized character with the reported probable alternatives for the at least one character, one by one, and in possible combinations in each encountered word, or by removing a character, thereby forming a plurality of spelling alternatives, and then measuring and recording number of hits for search results of each respective spelling alternative that has been formed in this manner, b) the system component compares the measured number of hits for each of the spelling alternatives with an upper predefined relative threshold level and a lower predefined relative threshold level, wherein each of the respective comparisons of the plurality of measurements falls into one of three possible outcomes:

i) if the measurement of a spelling alternative is above the predefined relative upper threshold level, the corresponding spelling alternative for this measurement is the correct spelling alternative for the word, and terminate the Internet search,
ii) if the measurement of a spelling alternative is below the lower predefined relative threshold level, the corresponding spelling alternative for this measurement is deemed non-existing, and the word with this spelling alternative is discarded from further investigations, and continue with other spelling alternatives that has been formed as search arguments for the Internet search engine,
iii) if the measurement of a spelling alternative falls between the upper relative threshold level and the lower relative threshold level, exit the Internet search engine and modify the search strategy providing further search arguments as a combination of members of the remaining spelling alternatives and other words encountered in the document, other character alternatives for the at least one uncertainly recognized character, phrases, adapting the upper relative threshold level, adapting the lower relative threshold level, and/or other information related to the output data from the OCR system, before continuing using the search strategy providing further measurements and comparisons for resolving the contradicting output data,
c) the system component is processing step b) a number of predefined times, or until there is only one spelling alternative left, whatever occurs first, providing an iteration amongst a plurality of different search arguments used in the search strategy before terminating step b), and using the remaining spelling alternative having the highest measurement above the upper relative threshold level as the correct spelling alternative.

30. The system according to claim 29, wherein the system component comprises substituting the at least one uncertainly recognized character with a combination of at least two characters when forming the spelling alternatives.

31. The system according to claim 29, wherein the system component comprises substituting two or more of the at least one uncertainly recognized character with a single character when forming the spelling alternatives.

32. The system according to claim 29, wherein the system component comprises a unit identifying if the spelling alternative under investigation is a proper name, and if so submit a query to the OCR process identifying other recognized words that are proper names, and then combine at least one of the other proper names properly recognized with the proper name under investigation as the spelling alternative.

33. The system according to claim 29, wherein the search system component comprises a unit using at least one preceding word relative to the word under investigation in combination with the word under investigation as the spelling alternative.

34. The system according to claim 29, wherein the system component comprises a unit using at least one succeeding word relative to the word under investigation in combination with the word under investigation as the spelling alternative.

35. The system according to claim 29, wherein the system component comprises a unit using at least one preceding word further away relative to the word under investigation in combination with the word under investigation as the spelling alternative.

36. The system according to claim 29, wherein the system component comprises a unit using at least one succeeding word further way relative to the word under investigation in combination with the word under investigation as the spelling alternative.

37. The system according to claim 29, wherein the system component comprises a unit using at least one preceding word further away relative to the word under investigation which comprise a number of characters above a predefined threshold in combination with the word under investigation as the spelling alternative.

38. The system according to claim 29, wherein the system component comprises a unit using at least one succeeding word further away relative to the word under investigation which comprise a number of characters above a predefined threshold in combination with the word under investigation as the spelling alternative.

39. The system according to claim 29, wherein the system component comprises a unit that:
i) obtains a counting of occurrence of words encountered in the image of the text from the OCR process, and store the occurrence numbers,
ii) selects at least one preceding word further away relative to the word under investigation which has a low occurrence number from i) under a predefined threshold and combine this word with the word under investigation as the spelling alternative.

40. The system according to claim 39, wherein the system component further comprises a unit that:
selects at least one succeeding word further away relative to the word under investigation which has a low occurrence number under a predefined threshold and combines this word with the word under investigation as the spelling alternative.

41. The system according to claim 29, wherein the system component comprises a unit that:
i) obtains a counting of occurrence of words encountered in the image of the text from the OCR process, and store the occurrence numbers,
ii) selects at least one preceding word further away relative to the word under investigation which has a high number of occurrences over a first predefined threshold and which comprise a high number of characters in the word above a second threshold in combination with the word under investigation as the spelling alternative.

42. The system according to claim 41, wherein the system component further comprises a unit that:
selects at least one succeeding word further away relative to the word under investigation which has a high number of occurrences over a first predefined threshold and which comprise a high number of characters in the word above a second threshold in combination with the word under investigation as the spelling alternative.

43. The system according to claim 29, wherein the system component comprises a unit that:
selects preceding words further away relative to the word under investigation one by one and store those preceding words that comprise a number of characters above a predefined threshold,
uses the stored words as search arguments in an Internet search engine, identify the word that provides a lowest number of hits different from zero, and use that word in combination with the word under investigation as the spelling alternative.

44. The system according to claim 29, wherein the system component comprises a unit that:
  selects succeeding words further away relative to the word under investigation one by one and store those preceding words that comprise a number of characters above a predefined threshold,
  uses the stored words as search arguments in an Internet search engine, identify the word that provides a lowest number of hits different from zero, and use that word in combination with the word under investigation as the spelling alternative.

45. The system according to claim 29, wherein the function providing comparison with the upper threshold and the comparison with the lower threshold is based on a renormalization of the thresholds and measured total number of hits.

46. The system according to claim 29, wherein the respective upper and lower threshold is changed incrementally upwards and downwards cooperatively.

47. The system according to claim 29, wherein the respective upper and lower threshold is changed incrementally upwards and downwards independently.

48. The system according to claim 29, whenever a spelling alternative is inconclusive, the spelling result providing the highest number of relative renormalized hits is selected as the most probable spelling alternative.

49. The system according to claim 29, wherein the system component, as an alternative or in addition to performing searches on the Internet, do searches in other information sources not accessible via the Internet, but which are accessible via an Intranet, VPR, or similar networks, or directly by searching a connected hard disc drive comprising information.

50. The system according to claim 49, wherein a user may select from a list comprising a range of information sites to be searched during the confirmation process by the system component.

51. The system according to claim 29, wherein the upper threshold is defined as $$\text{acceptance}(i) \Leftrightarrow \frac{\# \, hits_i}{\max(\# \, hits_j)_{j \neq i}} \geq \gamma(\# \, hits),$$

wherein i denotes one of the spelling of alternatives, $\#hits_i$ is the measured number of hits for spelling of alternative i, the denominator is the total measured number of hits for all spelling of alternatives, and $\gamma(\#hits)$ is a threshold level that is a function of the number hits.

52. The system according to claim 29, wherein the upper threshold is defined as $$\text{acceptance}(i) \Leftrightarrow \frac{\# \, hits_i}{\max(\# \, hits_j)_{j \neq i}} \geq \gamma(\# \, hits)$$

wherein i denotes one of the spelling of alternatives, $\#hits_i$ is the measured number of hits for spelling of alternative i, $\max(\#hits_j)_{j \neq i}$ is the total measured number of hits for all spelling of alternatives not including the spelling alternative for i, and $\gamma(\#hits)$ is a threshold level that is a function of the number hits.

53. The system according to claim 29, wherein the lower threshold is defined as:

$$\text{rejection}(i) \Leftrightarrow \frac{\# \, hits_i}{\# \, hits_i + \max(\# \, hits_j)_{j \neq i}} \equiv rBest(i) \leq \kappa(\# \, hits)$$

wherein $\#hits_i$ is the measured number of hits for spelling of alternative i, $\max(\#hits_j)_{j \neq i}$ is the total measured number of hits for all spelling of alternatives not including the spelling alternative for i, and $\kappa(\#hits)$ is a threshold level that is a function of the number hits.

54. The system according to claim 29, wherein a merit function is used to define a measurement for the number of hits as:

$$totscore(i) = aCRS_{word}(i) + b\frac{\# \, hits_i}{\max(\# \, hits_j)_{j \neq i}}$$

wherein a+b=1, $CRS_{word}(i)$ is a character score value from the OCR process related to the spelling of alternative i, $\max(\#hits_j)_{j \neq i}$ is the total measured number of hits for all spelling of alternatives not including the spelling alternative for i.

55. The system according to claim 29, wherein a merit function is used to define a measurement for the number of hits as:

$$totscore(i) = a'CRS_{word}(i) + b'(1 - \min(CRS_i)) - c'\frac{1 - \sum_{k=1}^{nchar} \Delta CRS_{i,k}}{nchar} + d' f(rBest(i)_{phrase}, rBest(i)_{single\ word}, rBest(i)_{mult\ word})$$

wherein a'+b'+c'+d'=1, $CRS_{word}(i)$ is a character score value from the OCR process related to the spelling alternative i, the second term is the minimum CRS for all the characters in the word, the third term is the sum of the CRS difference between the highest CRS for each character and the CRS using word (i), f is a minimum or maximum function of the upper threshold or lower threshold values as defined as:

$$\text{rejection}(i) \Leftrightarrow \frac{\# \, hits_i}{\# \, hits_i + \max(\# \, hits_j)_{j \neq i}} \equiv rBest(i) \leq \kappa(\# \, hits)$$

wherein $\#hits_i$ is the measured number of hits for spelling alternative i, $\max(\#hits_j)_{j \neq i}$ is the total measured number of hits for all spelling alternatives not including the spelling alternative for i, and $\kappa(\#hits)$ is a threshold level that is a function of the number hits; and nchar is the number of characters in the word i.

56. The system according to claim 29, wherein the OCR system is a speech recognition system, and the at least one uncertainly recognized character is an uncertainly interpretation of a phoneme.

* * * * *